United States Patent
Habermehl et al.

(10) Patent No.: US 11,287,652 B2
(45) Date of Patent: Mar. 29, 2022

(54) APPARATUS FOR GENERATING A VIRTUAL IMAGE WITH INTERFERENCE LIGHT SUPPRESSION

(71) Applicant: CONTINENTAL AUTOMOTIVE GMBH, Hannover (DE)

(72) Inventors: Kai Habermehl, Darmstadt (DE); Markus Schöpper, Spaichingen (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 17/122,294

(22) Filed: Dec. 15, 2020

(65) Prior Publication Data

US 2021/0096365 A1   Apr. 1, 2021

Related U.S. Application Data

(63) Continuation of application No. PCT/EP2019/065593, filed on Jun. 13, 2019.

(30) Foreign Application Priority Data

Jun. 15, 2018 (DE) .................. 10 2018 209 636.8
Jul. 4, 2018 (DE) .................. 10 2018 211 026.3

(51) Int. Cl.
*F21V 8/00* (2006.01)
*G02B 27/01* (2006.01)
*G02B 27/00* (2006.01)

(52) U.S. Cl.
CPC ....... *G02B 27/0101* (2013.01); *G02B 6/0078* (2013.01); *G02B 27/0081* (2013.01); *G02B 2027/011* (2013.01)

(58) Field of Classification Search
CPC .................. G02B 27/01; G02B 27/0101; G02B 27/0081; G02B 6/0078
See application file for complete search history.

(56) References Cited

U.S. PATENT DOCUMENTS

| | | | | |
|---|---|---|---|---|
| 5,771,321 A | * | 6/1998 | Stern | ........... G02B 26/02 385/31 |
| 2011/0255303 A1 | | 10/2011 | Nichol et al. | |
| 2012/0224062 A1 | | 9/2012 | Lacoste et al. | |

(Continued)

FOREIGN PATENT DOCUMENTS

EP    3026482 A1    6/2016

OTHER PUBLICATIONS

DigiLens (Anonymous): "White Paper Digilens' Waveguide Hud Technology", Jul. 20, 2016 (Jul. 20, 2016), XP055615979, retrieved from the Internet: URL:https://www.digilens.com/wp-content/uploads/2017/08/WPSite-DigiLens-Tech.pdf (Year: 2016).*

(Continued)

*Primary Examiner* — Alexander Eisen
*Assistant Examiner* — Cory A Almeida

(57) ABSTRACT

A device for generating a virtual image with stray light suppression comprises at least one light source for producing light with a specified wavelength, a display element for producing an image, and an optical waveguide for expanding an exit pupil. An aperture mask that has holes and non-transparent regions is arranged above an upper boundary surface of the optical waveguide.

11 Claims, 6 Drawing Sheets

(56) References Cited

U.S. PATENT DOCUMENTS

2015/0253469 A1  9/2015  Le Gros et al.
2016/0124223 A1  5/2016  Shinbo et al.

OTHER PUBLICATIONS

German Office Action dated Mar. 3, 2019 for the counterpart German Patent Application No. 10 2018 211 026.3.
International Search Report and the Written Opinion of the International Searching Authority dated Sep. 16, 2019 for the counterpart PCT Application No. PCT/EP2019/065593.
Anonymous, "White Paper Digilens Waveguide Hud Technology" Jul. 20, 2016 (Jul. 20, 2016), XP055615979.

\* cited by examiner

APPARATUS FOR GENERATING A VIRTUAL IMAGE WITH INTERFERENCE LIGHT SUPPRESSION

CROSS-REFERENCE TO RELATED APPLICATIONS

This U.S. patent application claims the benefit of PCT patent application No. PCT/EP2019/065593, filed Jun. 13, 2019, which claims the benefit of German patent application No. 10 2018 209 636.8, filed Jun. 15, 2018, and German patent application No. 10 2018 211 026.3, filed Jul. 4, 2018 all of which are hereby incorporated by reference.

TECHNICAL FIELD

The present invention relates to a device for generating a virtual image and to a method for producing an optical waveguide for such a device.

BACKGROUND

A head-up display, also referred to as a HUD, is understood to mean a display system in which the viewer can maintain their viewing direction, since the contents to be represented are superposed into their field of view. While such systems were originally primarily used in the aerospace sector due to their complexity and cost, they are now also being used in large-scale production in the automotive sector.

Head-up displays generally consist of an image generator, an optics unit, and a mirror unit. The image generator produces the image. The optics unit directs the image onto the mirror unit. The image generator is often also referred to as an image-generating unit or PGU (Picture Generating Unit). The mirror unit is a partially reflective, light-transmissive pane. The viewer thus sees the contents represented by the image generator as a virtual image and at the same time sees the real world behind the pane. In the automotive sector, the windshield is often used as the mirror unit, and the curved shape of the windshield must be taken into account in the representation. Due to the interaction of the optics unit and the mirror unit, the virtual image is an enlarged representation of the image produced by the image generator.

The viewer can view the virtual image only from the position of what is known as the eyebox. A region whose height and width correspond to a theoretical viewing window is called an eyebox. As long as one eye of the viewer is within the eyebox, all elements of the virtual image are visible to that eye. If, on the other hand, the eye is outside the eyebox, the virtual image is only partially visible to the viewer, or not at all. The larger the eyebox is, the less restricted the viewer is in choosing their seating position.

The size of the eyebox of conventional head-up displays is limited by the size of the optics unit. One approach for enlarging the eyebox is to couple the light coming from the image-generating unit into an optical waveguide. The light that is coupled into the optical waveguide undergoes total internal reflection at the interfaces thereof and is thus guided within the optical waveguide. In addition, a portion of the light is coupled out at a multiplicity of positions along the propagation direction. Owing to the optical waveguide, the exit pupil is in this way expanded. The effective exit pupil is composed here of images of the aperture of the image generation system.

Against this background, US 2016/0124223 A1 describes a display apparatus for virtual images. The display apparatus comprises an optical waveguide that causes light that is coming from an image-generating unit and is incident through a first light incidence surface to repeatedly undergo internal reflection in order to move in a first direction away from the first light incidence surface. The optical waveguide also has the effect that a portion of the light guided in the optical waveguide exits to the outside through regions of a first light exit surface that extends in the first direction. The display apparatus further comprises a first light-incidence-side diffraction grating that diffracts incident light to cause the diffracted light to enter the optical waveguide, and a first light-emergent diffraction grating that diffracts light that is incident from the optical waveguide.

In the currently known design of such a device, in which the optical waveguide consists of glass plates within which diffraction gratings or holograms are arranged, a problem arises in the case of solar radiation. The incident sunlight is refracted multiple times in the optical waveguide and decomposed into its spectral colors. These come out of the optical waveguide again at numerous locations and are refracted, among others, in the direction of the eye. This leads to a rainbow-like or contrast-reducing loss of quality. The actual image is then perceived only more weakly. Similar problems occur with other stray light sources.

Therefore, an improved device for generating a virtual image in which the influence of stray light is reduced is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A first aspect of a device for generating a virtual image comprises at least one light source for producing light with a specified wavelength, a display element for producing an image, an optical waveguide for expanding an exit pupil into which light coming from the display element is coupled, and an aperture mask that is arranged above an upper boundary surface of the optical waveguide and has holes and non-transparent regions.

Accordingly, it is proposed that the optical waveguide be provided with an aperture mask on its side facing the stray light source. This prevents the stray light from entering the optical waveguide. Due to the physical properties of the optical waveguide, the light coupled into the optical waveguide undergoes total internal reflection at the interfaces thereof and is thus guided within the optical waveguide. The desired light bundles exit the optical waveguide at predictable locations in the direction of the eye of the user. It is possible to restrict these positions very precisely to small surface areas. The smaller the surface area of the holes is in relation to the entire surface area of the aperture mask, the less stray light enters the optical waveguide. The aperture mask may also prevents most of the stray light that has nevertheless entered the optical waveguide from getting out again and into the driver's eye.

Thus, improvement in the image quality and in the contrast is achieved in the presence of stray light sources. Due to the reduced coupling of sunlight into the optical system, the heating of the system resulting from solar radiation also decreases, which likewise improves the image quality.

According to one aspect, the aperture mask has holes and non-transparent regions. The distance between the holes depends on the thickness of the optical waveguide and the angle of the refracted light bundle. The intermediate space may not be optically relevant for the virtual image. A non-transparent layer, for example an absorbing layer, is therefore applied outside the regions of the holes. This can be done, for example, in the form of a black print or a black coating.

According to one aspect, a reflective layer may be arranged between the upper boundary surface and the aperture mask. The reflective layer ensures that light reaching the non-transparent regions from the optical waveguide is reflected back into the optical waveguide. In this way it is ensured that, despite the non-transparent layer applied, total internal reflections occur at the interfaces of the optical waveguide.

According to one aspect, the reflective layer has holes, the positions of which correspond to the positions of holes in the aperture mask. The coupling of light out of the optical waveguide at the desired positions may be improved by the holes.

According to one aspect, an air gap or a layer made of a material whose refractive index lies in the region of the refractive index of air is arranged between the upper boundary surface and the aperture mask. In this way it can be ensured that, despite the non-transparent layer applied, total internal reflections occur at the interfaces of the optical waveguide.

According to one aspect, the device has at least two optical waveguides arranged one above the other in a stack, wherein an aperture mask is arranged on each of the optical waveguides. By using two or more optical waveguides, a multicolor or full-color representation of the virtual image can be realized. Each of the optical waveguides is used here for one of the colors used and can be optimized therefor. Since an aperture mask is arranged on each of the optical waveguides, the propagation of internal stray light in the optical system is also reduced in addition to the input coupling of external stray light.

According to one aspect of the invention, the holes in an aperture mask of an optical waveguide arranged further up in the stack have larger diameters than the holes in an aperture mask of an optical waveguide arranged further down in the stack. This makes it possible for the light bundles traveling through the holes from an optical waveguide arranged further down in the stack to pass, even after passing the holes located above them, through them as completely as possible despite the widening. At the same time, however, only the smallest possible amount of stray light enters the respective optical waveguides.

According to one aspect, a further aperture mask is arranged below a lower boundary surface of at least one of the optical waveguides. This further reduces the portion of stray light.

A device according as described herein may be used in a vehicle, in particular in a motor vehicle. The color of the aperture mask is in this case may be matched to the design of the dashboard of the vehicle. This prevents irritations of the driver or other road users, which can be caused by a non-uniform surface of the dashboard, and thus increases road safety.

According to a further aspect, a method for producing an optical waveguide for a device for generating a virtual image comprises applying a photoresist that is able to be exposed using a wavelength intended for the corresponding optical waveguide onto the optical waveguide or onto a reflective layer applied onto the optical waveguide, introducing the optical waveguide into the optical construction of the device, exposing the applied photoresist with a light source of the device for the intended wavelength, removing the unexposed parts of the photoresist, optionally applying a reflective layer outside the exposed regions of the photoresist, applying non-transparent regions outside the exposed regions of the photoresist, and removing the exposed parts of the photoresist.

The illumination of the applied photoresist with the device's light source for the intended wavelength may allow that the exposure takes place exactly where the holes are to be located later, that is to say where the light leaves the optical waveguide during operation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE FIGURES

The present disclosure will become more fully understood from the detailed description and the accompanying drawings, wherein.

DETAILED DESCRIPTION

For a better understanding of the principles of the present invention, embodiments of the invention will be described below in more detail with reference to the figures. The same reference signs are used in the figures for identical or functionally identical elements and are not necessarily described again for each figure. It is obvious that the invention is not restricted to the illustrated embodiments, and that the described features may also be combined or modified without departing from the scope of protection of the invention as defined in the accompanying claims.

Initially, a head-up display with an optical waveguide will be explained with reference to FIGS. 1 to 4.

Figure 1:
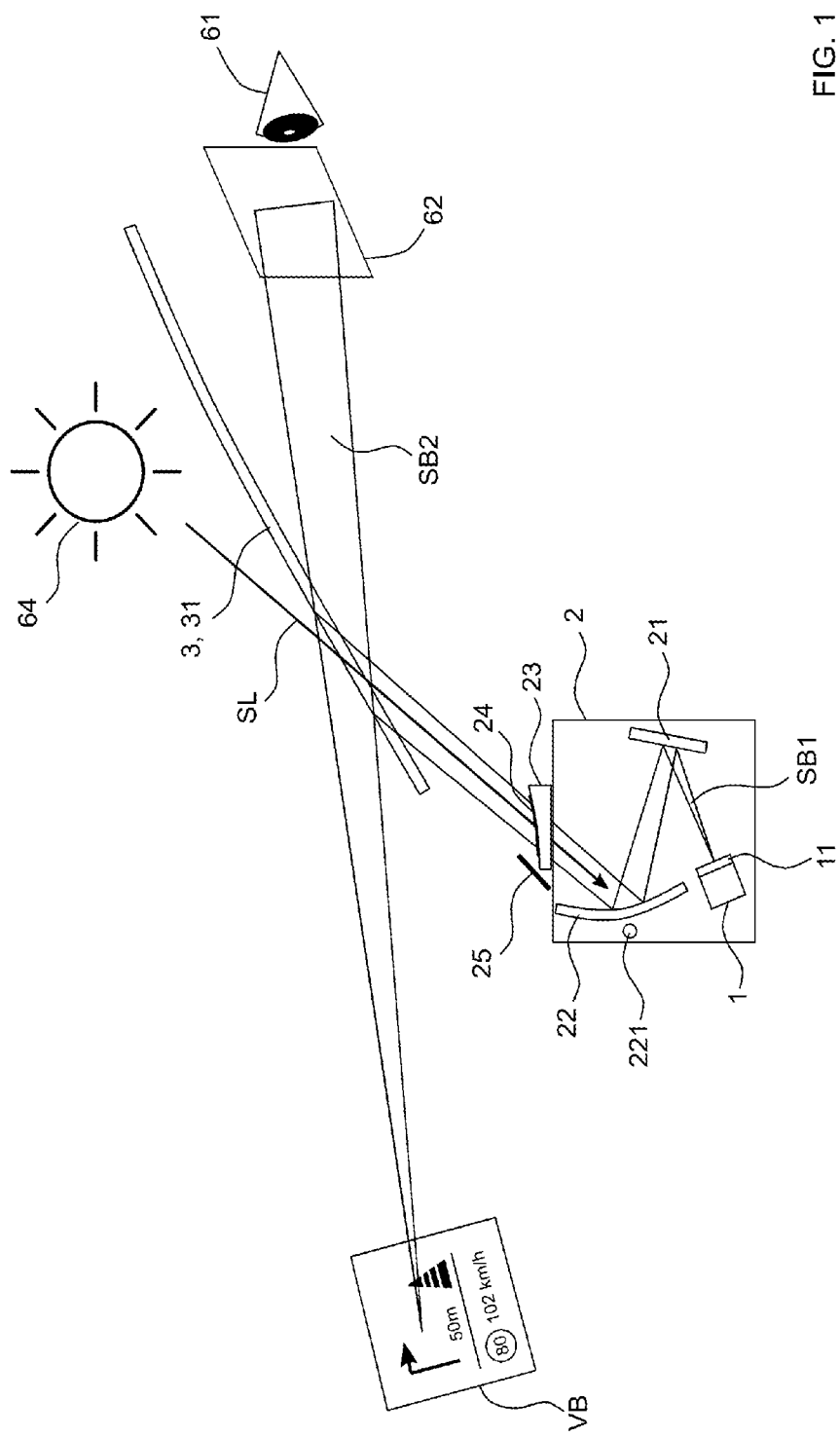
FIG. 1 schematically shows a head-up display according to the prior art for a motor vehicle.

FIG. 1 shows a schematic diagram of a head-up display according to the prior art for a motor vehicle. The head-up display has an image generator 1, an optics unit 2, and a mirror unit 3. A beam bundle SB1 emanates from a display element 11 and is reflected by a folding mirror 21 onto a curved mirror 22 that reflects it in the direction of the mirror unit 3. The mirror unit 3 is illustrated here as a windshield 31 of a motor vehicle. From there, the beam bundle SB2 travels in the direction of an eye 61 of a viewer.

The viewer sees a virtual image VB that is located outside the motor vehicle above the engine hood or even in front of the motor vehicle. Due to the interaction of the optics unit 2 and the mirror unit 3, the virtual image VB is an enlarged representation of the image displayed by the display element 11. A speed limit, the current vehicle speed, and navigation instructions are symbolically represented here. As long as the eye 61 is located within the eyebox 62 indicated by a rectangle, all elements of the virtual image are visible to that eye 61. If the eye 61 is outside the eyebox 62, the virtual image VB is only partially visible to the viewer, or not at all. The larger the eyebox 62 is, the less restricted the viewer is when choosing their seating position.

The curvature of the curved mirror 22 serves to prepare the beam path and thus to ensure a larger image and a larger eyebox 62. In addition, the curvature compensates for a curvature of the windshield 31, with the result that the virtual image VB corresponds to an enlarged reproduction of the image represented by the display element 11. The curved mirror 22 is rotatably mounted by means of a bearing 221. The rotation of the curved mirror 22 that is made possible thereby makes it possible to displace the eyebox 62 and thus to adapt the position of the eyebox 62 to the position of the eye 61. The folding mirror 21 serves to ensure that the path traveled by the beam bundle SB1 between the display element 11 and the curved mirror 22 is long and, at the same time, that the optics unit 2 is nevertheless compact.

The optics unit 2 is delimited with respect to the environment by a transparent cover 23. The optical elements of the optics unit 2 are thus protected for example against dust located in the interior of the vehicle. An optical film 24 or a coating that is intended to prevent incident sunlight SL from reaching the display element 11 via the mirrors 21, 22 is situated on the cover 23. Said display element 11 could otherwise be temporarily or permanently damaged by the resulting development of heat. In order to prevent this, an infrared component of the sunlight SL is filtered out for example by means of the optical film 24. Anti-glare protection 25 serves to block incident light from the front so that it is not reflected by the cover 23 in the direction of the windshield 31, which could cause the viewer to be dazzled. In addition to the sunlight SL, the light from another stray light source 64 may also reach the display element 11.

Figure 2:
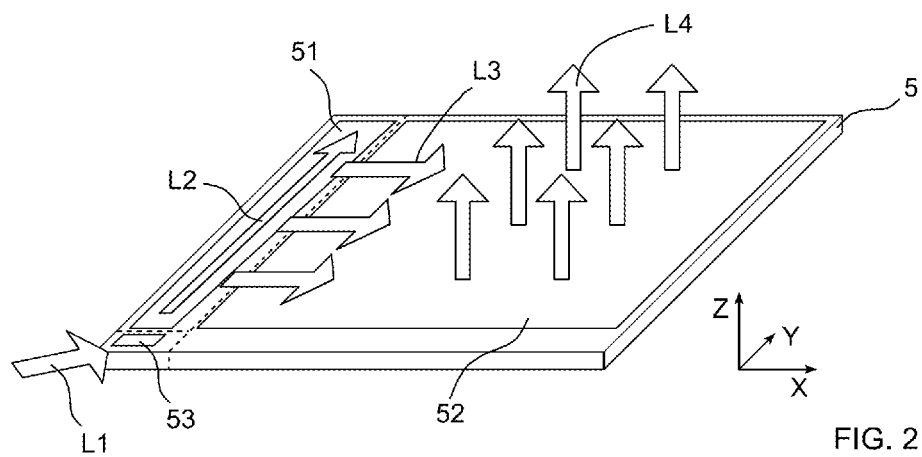
FIG. 2 shows an optical waveguide with two-dimensional enlargement.

FIG. 2 shows a schematic spatial illustration of an optical waveguide 5 with two-dimensional enlargement. In the lower left region, an input coupling hologram 53 can be seen, by means of which light L1 coming from an image-generating unit (not shown) is coupled into the optical waveguide 5. Said light propagates therein in the drawing to the top right, according to the arrow L2. In this region of the optical waveguide 5, a folding hologram 51 that acts similarly to many partially transmissive mirrors arranged one behind the other and produces a light bundle that is expanded in the Y-direction and propagates in the X-direction is located. This is indicated by three arrows L3.

In the part of the optical waveguide 5 that extends to the right in the figure, an output coupling hologram 52 is located, which likewise acts similarly to many partially transmissive mirrors arranged one behind the other and, indicated by arrows L4, couples light upward in the Z-direction out of the optical waveguide 5. In this case, an expansion takes place in the X-direction, so that the original incident light bundle L1 leaves the optical waveguide 5 as a light bundle L4 that is enlarged in two dimensions.

Figure 3:
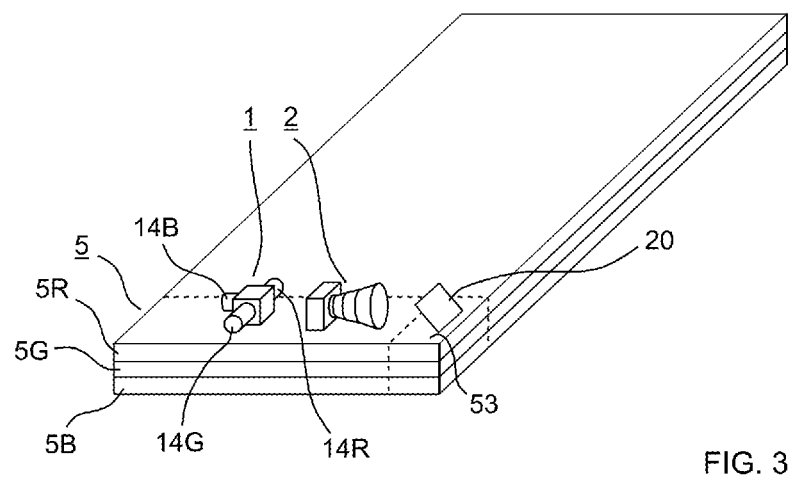
FIG. 3 schematically shows a head-up display with an optical waveguide.

FIG. 3 shows a three-dimensional illustration of a head-up display with three optical waveguides 5R, 5G, 5B, which are arranged one above the other and each stand for an elementary color red, green, and blue. Together they form the optical waveguide 5. The holograms 51, 52, 53 present in the optical waveguide 5 are each wavelength-dependent, meaning that one optical waveguide 5R, 5G, 5B is used in each case for one of the elementary colors. An image generator 1 and an optics unit 2 are shown above the optical waveguide 5. The optics unit 2 has a mirror 20, by means of which the light produced by the image generator 1 and shaped by the optics unit 2 is deflected in the direction of the respective input coupling hologram 53. The image generator 1 has three light sources 14R, 14G, 14B for the three elementary colors. It can be seen that the entire unit shown has a small overall structural height compared to its light-emitting surface.

Figure 4:
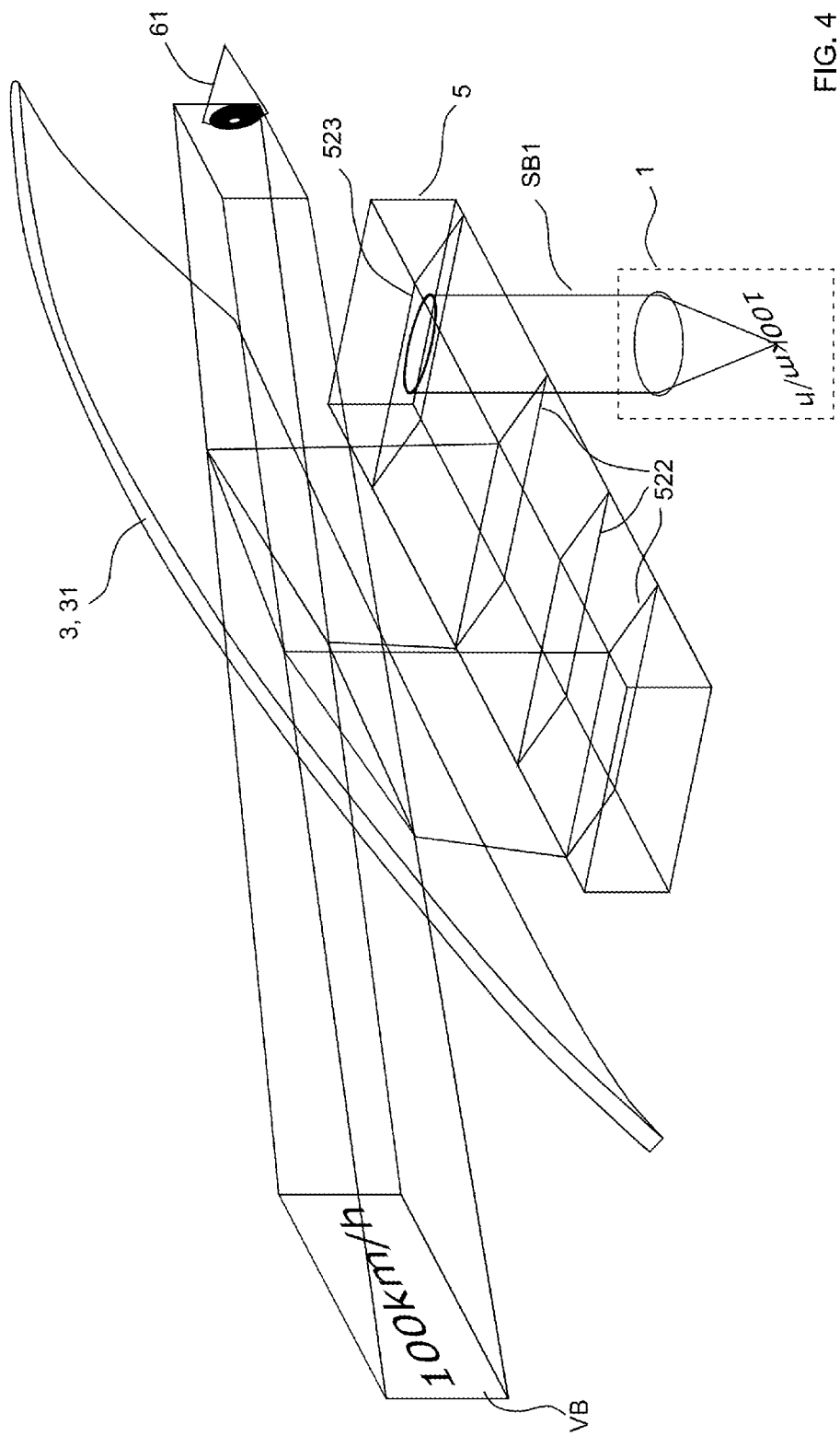
FIG. 4 schematically shows a head-up display with an optical waveguide in a motor vehicle.

FIG. 4 shows a head-up display in a motor vehicle similar to FIG. 1, except here in a three-dimensional illustration and with an optical waveguide 5. It shows the schematically indicated image generator 1, which produces a parallel beam bundle SB1 that is coupled into the optical waveguide 5 by means of the mirror plane 523. The optics unit is not shown for the sake of simplicity. A plurality of mirror planes 522 each reflect a portion of the light incident on them in the direction of the windshield 31, the mirror unit 3. The light is reflected thereby in the direction of the eye 61. The viewer sees a virtual image VB above the engine hood or at an even farther distance in front of the motor vehicle.

Figure 5:
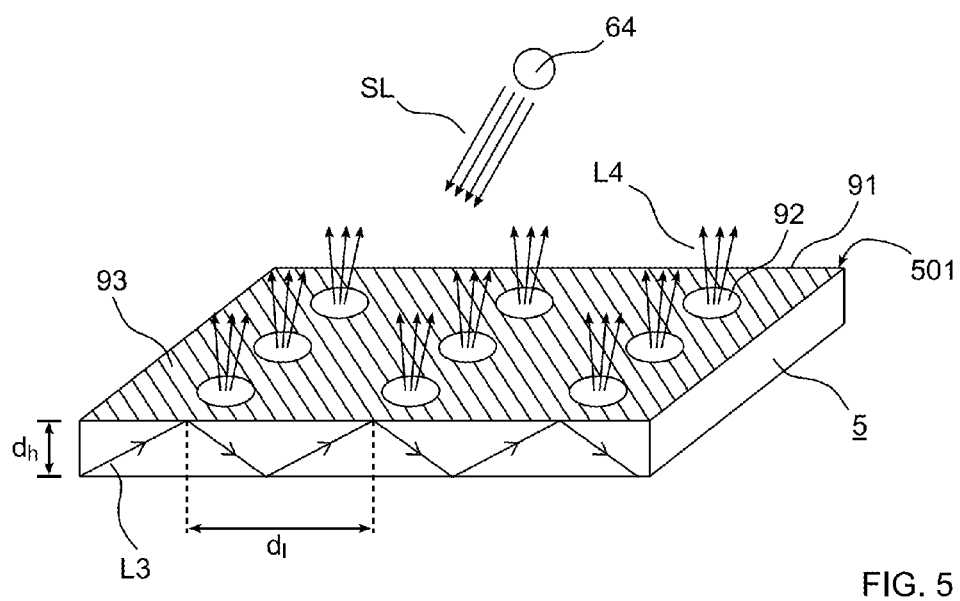
FIG. 5 schematically shows an optical waveguide of a device according to the invention for generating a virtual image.

FIG. 5 shows the optical waveguide 5 of a device in a schematic illustration. The aperture mask 91 arranged on the upper boundary surface 501, the light exit side of the optical waveguide 5, can be seen. It has transparent holes 92 and, around these holes 92, non-transparent, such as absorbing regions 93. The thickness of the optical waveguide 5 is denoted by $d_h$. The distances between the holes 92 are denoted by $d_l$. The light traveling in the optical waveguide 5 is denoted by L3, and the light exiting the optical waveguide 5 through the holes 92 is denoted by L4.

The sunlight SL coming from the sun, referred to as the stray light source 64, is incident on the non-transparent regions 93 of the aperture mask 91 and is prevented by these from entering the optical waveguide 5. Sunlight SL can only enter through the holes 92. Since these make up only a relatively small proportion of the surface area of the aperture mask 91, only a relatively small proportion of the sunlight SL enters the optical waveguide 5. This small proportion is reflected inside the optical waveguide 5 or leaves it at one of its other boundary surfaces. Therefore, only a small proportion of the sunlight SL which has passed through the holes 92 into the optical waveguide 5 reaches one of the holes 92 again from the inside and leaves the optical waveguide 5 there. The stray light reaching the eye 61 is thus greatly reduced.

Figure 6:
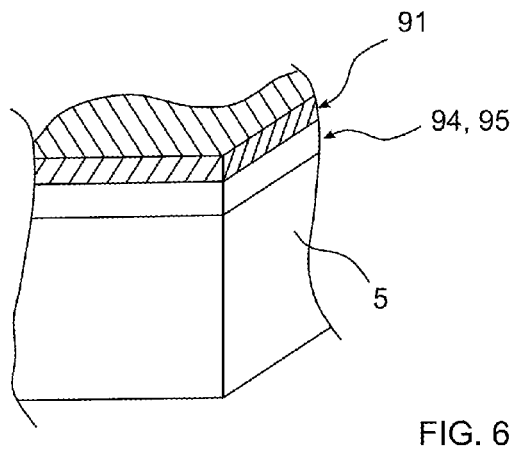
FIG. 6 schematically shows a layer structure of the optical waveguide from FIG. 5 in an enlarged illustration.

In FIG. 6, a corner of the optical waveguide 5 is shown enlarged. It shows a reflective layer 94 that is located between the aperture mask 91 and the optical waveguide 5 and likewise has holes at the locations of the holes 92. The reflective layer 94 ensures that light reaching the non-transparent regions 93 from the optical waveguide 5 is reflected back into the optical waveguide 5.

Alternatively, instead of a reflective layer, an air gap 95 at which the corresponding scenario takes place due to total internal reflection can be provided. Another alternative makes provision that, instead of the air gap 95, a layer made of a material whose refractive index is as close as possible to that of air is applied. This ensures both total internal reflection at the boundary surface and a stable arrangement of the aperture mask 91 on the optical waveguide 5.

Figure 7:
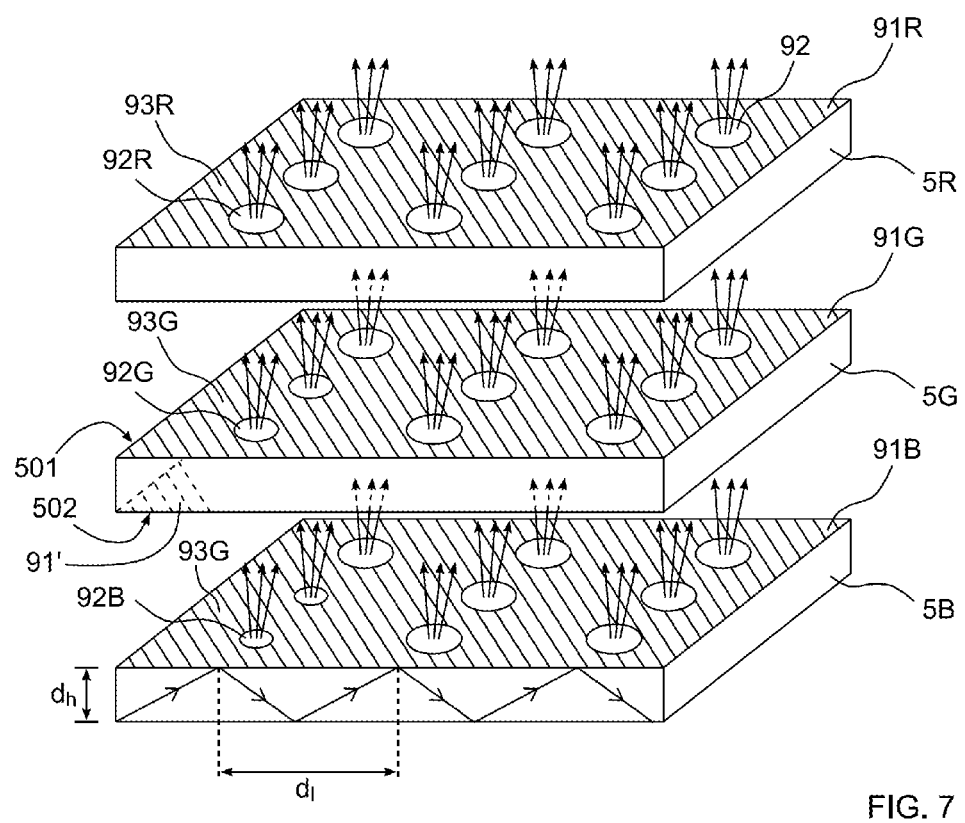
FIG. 7 schematically shows three optical waveguides arranged one above the other for different wavelengths.

FIG. 7 shows another variant of a device. Here, three optical waveguides 5R, 5G, 5B for three different wavelengths are arranged one above the other in a stack. Each of the optical waveguides 5R, 5G, 5B has an aperture mask 91R, 91G, 91B with the corresponding holes 92R, 92G, 92B and non-transparent regions 93, 93R, 93G, 93B on its light exit side. The holes 92R, 92G, 92B of the various aperture masks 91R, 91G, 91B are either all of the same size or have a size that is adapted to the respective optical waveguide 5R, 5G, 5B. This is indicated by way of example in the left area of the figure for two holes 92R, 92G, 92B. It can be seen there that the holes 92B in the aperture mask 91B of the lowermost optical waveguide 5B are significantly smaller than the holes 92G in the aperture mask 91G of the optical waveguide 5G arranged above, and these in turn are smaller than the holes 92R in the aperture mask 91R of the upper optical waveguide 5R. This makes it possible for the light bundles traveling through the holes 92B from the optical waveguide 5B to pass, even after passing the holes 92G, 92R located above them, through them as completely as possible despite the widening. At the same time, however, only the smallest possible amount of stray light SL enters the respective optical waveguides 5R, 5G, 5B.

Another variant is indicated for the middle optical waveguide 5G. In addition to the aperture mask 91G on the upper boundary surface 501, a further aperture mask 91' can be seen on the lower boundary surface 502. This further reduces the portion of stray light.

Figure 8:
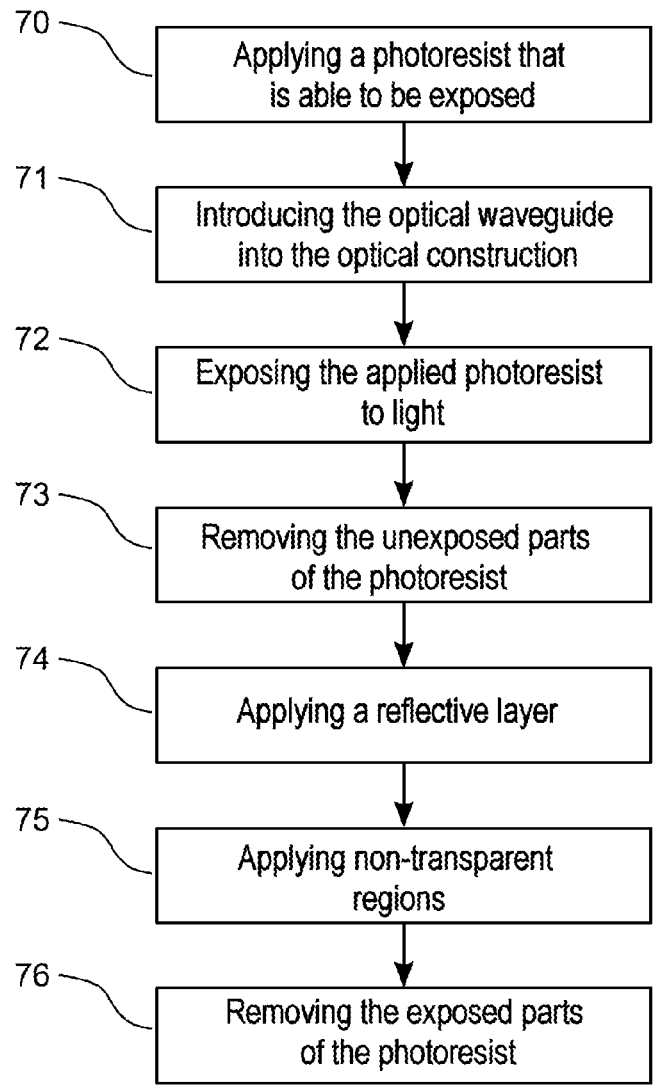
FIG. 8 schematically shows a method for producing an optical waveguide for a device according to the invention.

FIG. 8 schematically shows a method for producing an optical waveguide for a device. The holes may be produced with high precision by first applying 70 a photoresist that is able to be exposed to the wavelength intended for the corresponding optical waveguide onto the boundary surface of the optical waveguide. A reflective layer can also be applied previously onto the optical waveguide. In this case, the photoresist is applied 70 onto the reflective layer. The optical waveguide coated with photoresist is then introduced 71 into the optical construction of the device and subsequently exposed 72 with the light source of the device for the intended wavelength. Therefore, the exposure takes place where the holes are to be located later, that is to say where the light leaves the optical waveguide during operation. After the exposure, the unexposed parts of the photoresist are removed 73. Only the exposed parts of the photoresist thus remain on the optical waveguide.

If no reflective layer was applied at the beginning of the method, a reflective layer can now optionally be applied 74 outside the exposed regions of the photoresist. In this case, the reflective layer has holes, the positions of which, after completion, correspond to the positions of holes in the aperture mask. Subsequently, the non-transparent regions are applied 75 outside the exposed regions of the photoresist, and, finally, the exposed parts of the photoresist are removed 76.

An alternative production method provides a precisely aligned printing process for applying the aperture mask and, if necessary, the reflective layer.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. A device for generating a virtual image comprising:
   at least one light source for producing light with a specified wavelength;
   a display element for producing an image;
   an optical waveguide for expanding an exit pupil into which light coming from the display element is coupled;
   a first aperture mask that is arranged above an upper boundary surface of the optical waveguide where the first mask defines a first plurality of holes and non-transparent regions;
   at least two optical waveguides are arranged one above the other in a stack;
   at least one second aperture mask, wherein the first aperture mask and the at least one second aperture mask are each arranged on one of the at least two optical waveguides; and
   wherein the holes in the first or the at least one second aperture mask of an optical waveguide arranged further up in the stack have larger diameters than the holes in the others of the first or the at least one second aperture mask of an optical waveguide arranged further down in the stack.

2. The device as claimed in claim 1, wherein a reflective layer is arranged between the upper boundary surface and the first aperture mask.

3. The device as claimed in claim 2, wherein the reflective layer defines a second plurality of holes, the positions of which correspond to the positions of first plurality of holes in the first aperture mask.

4. The device as claimed in claim 1, wherein one of an air gap and a layer made of a material whose refractive index lies in the region of the refractive index of air is arranged between the upper boundary surface and the first aperture mask.

5. The device as claimed in claim 1, wherein a third aperture mask is arranged below a lower boundary surface of at least one of the optical waveguides.

6. A vehicle with a device for generating a virtual image comprising:
   at least one light source for producing light with a specified wavelength;
   a display element for producing an image;
   an optical waveguide for expanding an exit pupil into which light coming from the display element is coupled;
   a first aperture mask that is arranged above an upper boundary surface of the optical waveguide where the first mask defines a first plurality of holes and non-transparent regions;
   at least two optical waveguides are arranged one above the other in a stack;
   at least one second aperture mask, wherein the first aperture mask and the at least one second aperture mask are each arranged on one of the at least two optical waveguides; and
   wherein the holes in the first or the at least one second aperture mask of the optical waveguide arranged further up in the stack have larger diameters than the holes in the others of the first or the at least one second aperture mask of the optical waveguide arranged further down in the stack.

7. The vehicle as claimed in claim 6, wherein a reflective layer is arranged between the upper boundary surface and the first aperture mask.

8. The vehicle as claimed in claim 7, wherein the reflective layer defines a second plurality of holes, the positions of which correspond to the positions of first plurality of holes in the first aperture mask.

9. The vehicle as claimed in claim 6, wherein one of an air gap and a layer made of a material whose refractive index lies in the region of the refractive index of air is arranged between the upper boundary surface and the first aperture mask.

10. The vehicle as claimed in claim 6, wherein a third aperture mask is arranged below a lower boundary surface of at least one of the optical waveguides.

11. A method for producing an optical waveguide for a device comprising:
- applying a photoresist that is exposed using a wavelength intended for the corresponding optical waveguide onto one of the optical waveguide and a reflective layer applied to the optical waveguide;
- introducing the optical waveguide into the optical construction of the device;
- exposing the applied photoresist with the light source of the device for the intended wavelength;
- removing the unexposed parts of the photoresist;
- optionally applying a reflective layer outside the exposed regions of the photoresist;
- applying non-transparent regions outside the exposed regions of the photoresist;
- removing the exposed parts of the photoresist;
- arranging at least two of the optical waveguides one above the other in a stack;
- providing at least one first aperture mask and at least one second aperture mask, and
- arranging the first aperture mask and the at least one second aperture mask on one of the at least two optical waveguides such that the optical waveguide arranged further up in the stack have larger diameters than the holes in the others of the first or the at least one second aperture mask of the optical waveguide arranged further down in the stack.

* * * * *